July 22, 1969  D. W. MOHRMAN ET AL  3,456,338
METHOD FOR CHANGING THE CONFIGURATION OF AND FOR BONDING
ELECTRICAL COILS OF INDUCTIVE DEVICES
Filed July 11, 1966  2 Sheets-Sheet 1
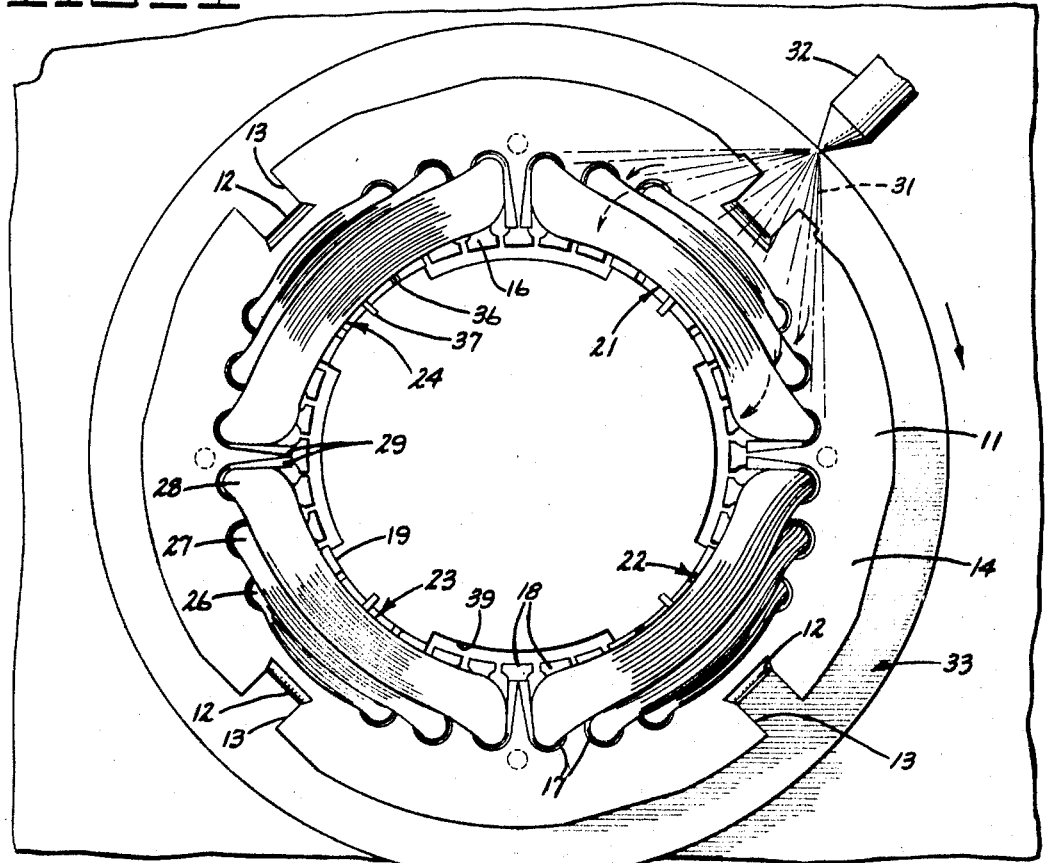
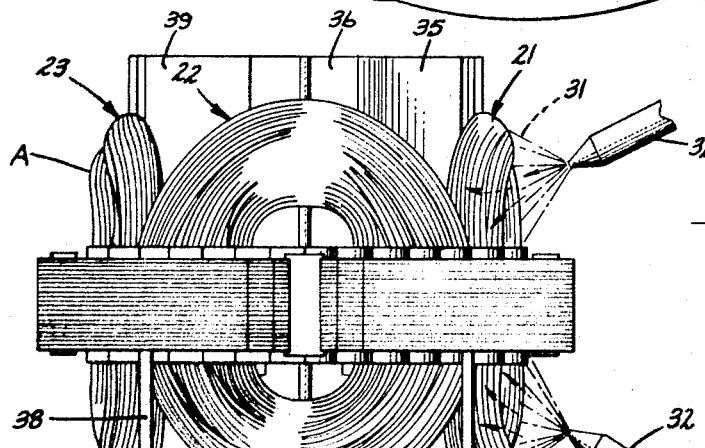
INVENTORS:
Donald W. Mohrman,
Francisco C. Avila,
BY John M. Stoudt
ATTORNEY

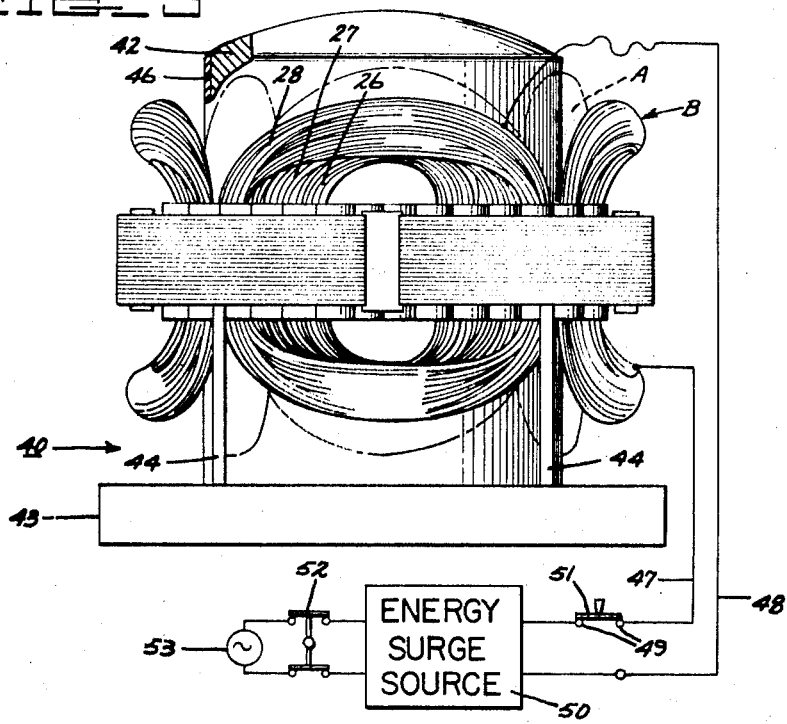
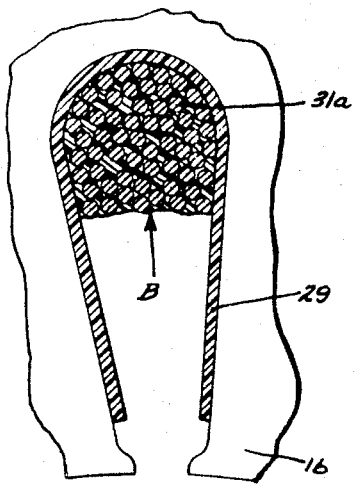
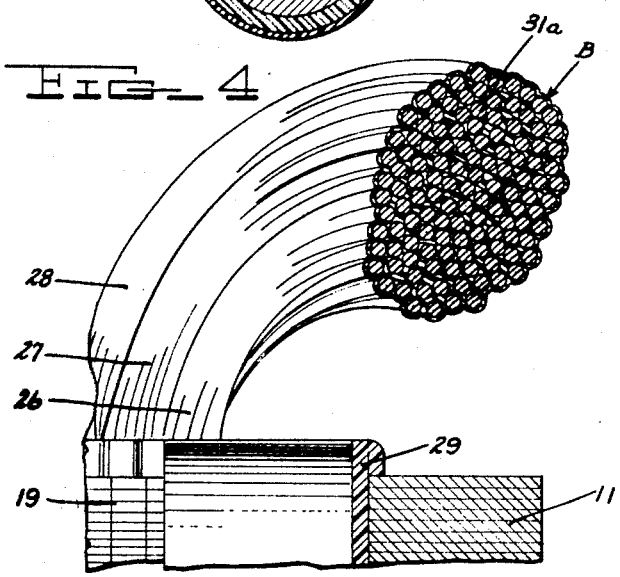
INVENTORS:
Donald W. Mohrman,
Francisco C. Avila,
BY John M. Staudt
ATTORNEY United States Patent Office 3,456,338
Patented July 22, 1969

3,456,338
METHOD FOR CHANGING THE CONFIGURATION OF AND FOR BONDING ELECTRICAL COILS OF INDUCTIVE DEVICES
Donald W. Mohrman, Fort Wayne, and Francisco C. Avila, Roanoke, Ind., assignors to General Electric Company, a corporation of New York
Filed July 11, 1966, Ser. No. 564,379
Int. Cl. H01f 7/06; B23k 31/02
U.S. Cl. 29—606                                10 Claims

ABSTRACT OF THE DISCLOSURE

Method for changing the configuration of electrical coil turn portions and for bonding the portions together once they have been changed to the desired shape. With the coil accommodated in a slotted core and with the portions having unhardened bonding material, an electrical surge is generated in the turn portions. Forces are produced by the surge which change the portions into the desired configuration and the bonding material once hardened insures securement of the portions in the desired position.

---

This invention relates to an improved method for changing the configuration of and for bonding electrical coils of inductive devices. In particular, the invention pertains to an improved method especially suitable for transforming electrical coils, defined by a number of conductor turns having portions accommodated in slots of a magnetic core, from one configuration into another and for bonding the coil turns to maitain the turns in the another configuration.

During the manufacture of electrical inductive devices, it is generally necessary to dispose a number of coils, each formed by a plurality of conductor wire turns, in coil accommodating slots of a magnetic core and then to compact and press back the coils into a desired position. For example, in certain stators used in fractional and small horsepower motors, a first plurality of coils is introduced into the stator slots, compacted and pressed back, both in the slots and at the end turns projecting beyond the end faces of the core, in preparation for the accommodation of a second coil plurality by the core. By way of specific illustration, two phase motors as well as single-phase induction type electric motors generally incorporate a stator core carrying two separate and distinct coil pluralities or windings. In the fabrication of such stators having two sets of windings, such as distributed main and auxiliary windings, the main winding is normally placed into the slots, compacted and forced back away from the bore toward the bottom of the slots at one manufacturing location to make space for receiving the auxiliary winding. Until recently, it was common practice to transport the core having the main winding to a second location where physical pressure engagement with the coils of the main winding was employed to perform the necessary coil configuration changing operation. The core was then transferred to a third location for the placement of the auxiliary winding in the slots.

Recent innovations now allow the coil configuration changing operation to be achieved with electrical energy rather than by brute force techniques. Pending United States patent applications Ser. No. 414,822 now U.S. Patent 3,333,327; 414,824 now U.S. Patent 3,333,335; 414,825 now U.S. Patent 3,333,330; 414,826 now U.S. Patent 3,333,328; all filed on Nov. 30, 1964, Ser. No. 513,028 filed Dec. 10, 1965 and all assigned to the assignee of the present application are typical of these new innovations.

For those applications which have substituted the electrical energy approach at the one manufacturing location for the physical engagement technique, it is desirable that the first coil plurality be firmly secured in the desired compacted and pressed back positions so that the individual turns will be satisfactorily maintained in the desired configuration even though the core and its winding are subsequently mishandled. Mishandling might occur, for example, as the core is being transferred to the second winding placement location or as the core is being prepared by an operator for installation of additional windings. It is especially desirable that the method for holding the individual turns of the first coil plurality firmly together be suitable for economical and efficient employment in the mass production of motor stators and other electromagnetic devices without requiring that substantial changes be made to manufacturing facilities already in use.

Accordingly, it is a primary object of the present invention to provide an improved method for changing the configuration of and for bonding electrical coils of inductive devices, and more specifically to an improved method especially suitable for achieving these ends in connection with the coils accommodated in the slots of a magnetic core, such as a stator core.

It is a further object of the present invention to provide an improved method of manufacturing electrical coils of inductive devices which attains the desirable features mentioned above.

It is a further object of the present invention to provide an improved method for compacting the individual turns of the coils while pressing back the end turns into the desired configuration, and for securing the individual turns firmly together in the desired configuration by an economical procedure which is easily practiced.

In carrying out the objects of the invention in one form, we provide an improved method for changing the configurtaion of preselected conductor turn portions of at least one electrical coil which is formed by a number of conductor turns and for bonding the turn portions together once the portions have been changed to the desired configuration. In particular, with the preselected coil turn portions having an initial unformed configuration accommodated by a slotted structure, such as a magnetic core, and further having unhardened bonding material in contact therewith, at least one surge of electrical energy is generated in the conductor turns, either by a direct application or by induction of energy in the turns. This energy surge, in turn, produces electromagnetic forces acting on the coil turns which changes the configuration of the preselected turn portions to the desired shape. The bonding material in the practice of the method may be applied to the unformed coils after the coil side portions have been placed into suitable slots of the accommodating structure. The bonding material may also take the form of a self-bonding type coating which covers the individual turns and is applied on the conductor material at some point in time before the turns have been placed into the slots.

After the desired configuration has been attained, the bonding material insures the securement of the turn portions in the desired position relative to the core which do not have a tendency to move away from that position even where they are subjected to unusual stress, as might occur from mishandling or the like. In addition, the method of the present invention may be efficiently utilized in existing manufacturing facilities with a minimum of change in equipment at a low cost.

The subject matter which we regard as our invention is particularly pointed out and distinctly claimed in the concluding portion of this specification. Our invention, itself, however, both as to its organization and method of operation, together with further objections and advantages thereof may best be understood by reference to the following description taken in connection with the accompanying drawings in which:

FIGURE 1 is a plan view of one way in which unhardened adherent bonding material is applied to the unformed electrical coils accommodated in a magnetic core;

FIGURE 2 is an elevational view of the step shown in FIGURE 1;

FIGURE 3 is an elevational view, partly in diagrammatic form of the forcing back of the coils from the unformed to the desired final positions;

FIGURE 4 is an enlarged, partial sectional view of the core and formed coils produced by one form of the present method;

FIGURE 5 is an enlarged, partial sectional view of one of the coil accommodating core slots and coil side disposed therein; and FIGURE 6 is an enlarged cross-sectional view of a single conductor turn in a coil revealing a modified form of the present invention.

Referring now more particularly to the drawings, for purposes of disclosure, the preferred embodiment is illustrated in connection with electrical coils defining a main field winding of a dynamoelectric machine stator member. The stator core, generally indicated by numeral 11, is constructed of a predetermined number of stacked or aligned magnetic laminations which are punched into the illustrated configuration from suitable relatively thin magnetic sheet material, such as electrical steel or iron. The laminations are conventionally secured together in stacked face to face relation by keys 12 frictionally received in complementing angularly spaced apart notches 13 extending axially across the stack. The laminations are aligned in the usual way to form an outer yoke section 14 and angularly spaced apart teeth sections 16 (a total of thirty-six) projecting radially inwardly from the yoke section to define a corresponding number of open ended coil accommodating slots 17 angularly therebetween. The tooth sections each terminate in an enlarged lip portion which together form a central opening or rotor receiving bore 19.

As shown in FIGURES 1 and 2, the stator core of the exemplification, carries an unformed main field winding of the distributed wound type having four identical coil groups 21, 22, 23 and 24, with each group being comprised of three concentric, serially connected, coils 26, 27, 28 conventionally arranged on the core to provide adjacent poles of alternate instantaneous polarity. Each coil, in turn, is wound of a predetermined number of wire conductor turns; e.g., aluminum, copper or the like, having a conventional relatively thin continuous coating of electrical insulation or enamel adhering to the individual turns.

Unformed coils 26, 27, 28, prior to carrying out one form of the present invention thereon, have pairs of side portions received in selected pairs of slots, with end turn portions joining the pairs of side portions together axially beyond the respective end faces of the core in the usual way. The coils may be electrically insulated from the core in any suitable fashion, as by a standard generally U-shaped slot liner 29 composed of electrical ground insulation such as polyethylene terephthalate sheet material provided in each slot next to the slot wall. The winding and inserting operations for arranging the unformed coils on the core in the manner illustrated in FIGURES 1 and 2 may be accomplished in any convenient way, as for example, using the winding machine disclosed in the U.S. Patent 2,836,204 issued to L. M. Mason on May 27, 1958.

Thus, at this stage of the stator fabrication, due at least in part to the turn distribution of the coils, there is a general tendency for the radially inner coil turns to be urged in the direction of the axis of the core, with the individual turns being somewhat loosely distributed in the unformed or initial position relative to the core, position "A," best shown in FIGURE 1.

In applying one form of the present invention to the stator core and coils of the exemplification, adhesive bonding material 31, such as a solution of thermosetting resin or other suitable adherent material, is deposited or otherwise provided in an unhardened state onto the unformed coils prior to their change in configuration from that illustrated in FIGURES 1 and 2 to the final configuration shown in FIGURES 3, 4, and 5. The unhardened bonding material may be provided in any suitable fashion, as by the illustrated applicators or nozzles 32 in FIGURES 1 and 2 and rotatable fixture 33 which revolves the exposed coil portions past the nozzles.

In view of the relatively loose turn distribution in at least the end turn portions, material 31 readily penetrates into the confines of the coils and coats the turns over the enamel. For those core situations having low slot space factors and relatively uncompacted side turn portions, the material will travel along the individual turns from the end turn portions and coat the parts of the turns contained within the slots. For those applications where the side turn portions have already been compacted to some extent, depending upon the slot space factor and degrees of compaction already attained, the material will enter and fill the interstices or spaces existing between the turns by a combination of such factors as gravity, capillary action, and the like. In any case, it will be appreciated that neither the precise manner of application of material 31 nor the exact position of the core during the application are important in the practice of our invention and some way other than that shown may be employed, such as by dipping at least the end turn portions into a suitable open ended container having material 31.

Returning now to a consideration of the illustrated equipment used in the present exemplification of FIGURES 1 and 2 for applying the material, the rotatable fixture 33 includes a horizontal base plate 34 which mounts a central upright cylinder 35 formed with a number of angularly spaced apart raised surfaces 36 adapted to fit within the bore of the stator core next to tooth terminations at spaced apart locations. Each raised surface has a vertical protuberance 37 or key for entering a slot entrance in order to lock onto the fixture, with upright posts 38 mounted to plate 34, holding the core in spaced relation above the plate so that the respective coil end turns are exposed to applicators 32. Fixture 33 may be slowly rotated past the applicators by a gear means or the like indicated at 41 in FIGURE 2 until the desired amount of material has been applied onto the end turn portions. Any excess material may be carried away through the vertical spaces 39 between raised surfaces 36.

With the bonding material 31 in the unhardened condition coating the conductor turns and permeating the coil mass, the coils are pressed back away from the core axis into the desired configuration, such as that shown in full in FIGURES 3, 4, and 5 without mechanically engaging the outer surfaces of the coil scale and end turn portions. This press back is achieved while the coils carry the bonding material by generating at least one surge of electrical energy in the electrical coils of sufficient magnitude to create electromagnetic forces which act upon the coils and press the coil portions back away from the core axis, both the side portions in the slots as well as the end turn portions. The energy is, however, below that which deleteriously affects the coil enamel.

In carrying out this step of the method, in the illustrated exemplification, the core is transferred from fixture 33 to a second fixture, such as that revealed in FIGURE 3 and indicated by numeral 40. As shown, cylinder 42 of electrically conductive, nonmagnetic material such as copper or aluminum or the like, is mounted at one end to a base plate 43 which has angularly spaced apart upright posts 44 for engaging the lower end face of the core to support the coils in spaced relation to plate 43. In the assembled position, cylinder 42 fits within the bore of the core and extends beyond the axial limits of the coil end turn portions. Suitable electrical insulation 46 covers the outer surface of the cylinder in order to electrically insulate the innermost turns of the coils which are urged toward the core axis, from the conductive cylinder, Wire terminations 47, 48 of the winding carried by the core are electrically attached to terminal connectors 49 of a suitable energy surge supply or source 50, such as the one fully described and disclosed in the aforementioned patent application Ser. No. 414,826.

By way of illustration, in order to supply the preselected energy surge to the coils, a switch 51 is connected in the circuit of the energy surge source for initiating actuation of the source which is in turn conected through switch 52 to a suitable source of alternating current 53. Closing of the switch actuates a circuit for charging a capacitor bank in source 50 to a predetermined voltage level which is regulated by a variable control transformer (not shown). Thereafter, the capacitor bank is discharged and a surge of electrical energy, as controlled by the voltage level on the capacitor bank, is applied directly to the coils across the output terminal connectors 49.

The surge of current flow in the windings creates an interaction with the cylinder 43 such that electromagnetic forces are produced which act on the turns to transform the coils from the configuration shown by broken lines to that revealed by the solid lines in FIGURE 3 in a manner more fully described in the copending Rushing application. These forces drive the individual turns together into a compact bundle away from the core axis and cylinder 42. Even where adjacent turns were initially in spaced relation and had the bonding material 31 covering the turns (portion A), the material becomes fused together into a homogenous mass during the press back operation. As depicted by FIGURES 4 and 5, the conductor turns in both the end turn and side turn portions will be firmly compacted together into a tight bundle, with material 31 filling any space which might exist between adjacent turns. Further, the coil portions at the end turns are in the desired position B, radially and axially toward the end faces and away from the bore, leaving sufficient space for accommodating end turns of another winding to be subsequently installed on the core. In the slots (FIGURE 5) the coil side portions are pressed against the bottom walls of the slots so that the slots are capable of receiving additional turns of the other winding.

Thereafter, the bonding material between adjacent turns is hardened as by any suitable application of heat if the material is thermo-responsive, while the coils are disposed in position B such that the material in effect becomes a matrix 31a in which the coil turns are firmly embedded. For some applications using thermo-responsive material and relatively high resistance wire, sufficient heat may be generated in the turns during press back to effect the desired hardening without more.

The following example is given to show how the present invention as outlined above has been carried out in actual practice. The core was similar to that illustrated having a nominal stack length of 1⅛ inch, an outer diameter of 5.5 inches, a bore diameter of 3.125 inches. The main winding had four poles of three coils each, with thirty-two, forty-two, and forty-eight turns (innermost to outermost) of polyvinyl formal resin covered copper wire having a diameter of 0.0302 inch.

The bonding material 31 was a 50% solids solution of Spon Resin 872 x −75 with 200 parts or 150 grams resin solids, nine parts Shell chemical hardener U, and acetone solvent. After the end turns were lightly coated with the solution which penetrated into the interstices of the coils in their unformed state and covered the turns, the solvent was permitted to evaporate by allowing the core to stand at room temperature for approximately an hour and a half. Thereafter, the coils were transformed in the manner shown in FIGURE 3 from position A to position B by charging a capacitor bank rated at 800 microfarads to a level of 2400 volts and discharging the surge of approximately 2304 joules into the winding coils. The material was then hardened or cured over a 12 hour period at room temperature. The bundle of individual turns were firmly held together in position B by the hardened material 31a as revealed in FIGURES 3, 4, and 5.

Consequently, it will be seen from the foregoing that the present invention is highly effective to compact end turns and side portions and bond these portions together by an inexpensive yet highly effective process. In addition, the coils are firmly secured in the desired compacted and pressed back position and resist movement relative to the core even though they might be subsequently mishandled. Moreover, no other means is necessary to retain the coils in the pressed back position which is their finally assembled position on the core. Furthermore, the method is economical and may be satisfactorily employed in mass production of stators or other electromagnetic devices without requiring that substantial changes be made in manufacturing facilities and equipment already in use.

It will be appreciated from the foregoing description that the invention can advantageously be used in pressing back and bonding turns of concentrated type windings (e.g., single coil per pole) stators already having two windings in plate) and electromagnetic devices other than stators where it is desirable to press back and bond electrical coils.

Turning now to FIGURE 6, there is depicted a cross-section view of a self-bonding type wire which may be employed in the practice of our process to produce electromagnetic devices for certain applications. In the figure, numeral 56 is the electrical conductor having an enamel coating 57 which in turn is covered by bonding material 58 applied to the enamel before the conductor has been installed on the core. In one example, material 58 may be hardened thermoplastic epoxy resin, such as Eponol resin having a high molecular weight in the range of 80–200,000. Taking polyvinylbutyral by way of illustration, it tends to soften at 125° centigrade and bonds best as approximately 150° centigrade with a moderate amount of pressure being applied.

In the practice of our method and using polyvinylbutyral and the stator of the exemplification as an illustration, after the turns have been placed into the core slots to position A, the polyvinylbutyral is then preferably heated until it becomes sufficiently soft to provide the desired adhesive quality. This may be done just prior to the generation of the energy surge in the coils by any suitable way, such as connecting the coils to a D.C. source of energy in the manner shown in the R. F. Baun Patent 3,145,127 and energizing the coils until they become heated to a temperature above 125° centigrade. Then with the bonding material in the unhardened state, a surge of energy may be generated in the coils as already outlined to press back the coils and bond the turns together. In light of the type of pressures developed during press back of the coils resulting from the generation of the energy surge, it is possible with high resistance wires to create sufficient heat and pressure during the press back step to soften the bonding material which under these conditions will satisfactorily bond turns together at temperatures between 110–130° C.

Still referring to FIGURE 5, self bonding material 58 could be of the pressure sensitive type in view of the type of electromagnetic forces which are developed by the generation of energy surges in the coils during press back. For instance, material 58 may be formed of acrylonitrile, styrene butadiene rubber or the like initially which has solvent such as toluene contained in small membranes dispersed throughout the covering. During press back of the coils, resulting from the electromagnetic forces established by the generation of the energy surge in the coils, the membranes are crushed so that the solvent escapes and comes into contact with the material. This, in turn, produces an adhesive quality for the material, and as the turns are driven firmly together by the energy surge, the turns will adhere together. Once the solvent evaporates, material 58 will return to its original non-adhesive condition, with the material 58 between turns becoming united into a homogeneous mass to secure the turns firmly in position B in the exemplification.

It should be apparent to those skilled in the art that while we have shown and described what at present are considered to be the preferred embodiments of our invention in accordance with the patent statutes, modifications may be made therein without actually departing from the true spirit and scope of this invention, and we therefore intend to cover in the following claims all such equivalent variations as fall within the invention.

What we claim as new and desire to secure by Letters Patent of the United States is as follows:

1. A method for bonding a preselected portion of at least one electrical coil formed by conductor turns as the coil is being carried in its unformed state by a magnetic core and has bonding material on at least the preselected portion of the unformed coil, the method comprising the steps: generating at least one surge of electrical energy in the unformed electrical coil, within the bonding material being in contact with the preselected portion of the coil in its unformed state; changing the configuration of the coil into a desired shape by virtue of the electrical energy surge generated therein; and bonding the preselected coil portion in the desired shape with the bonding material.

2. The method of claim 1 in which the bonding material is applied to preselected individual turn portions of the unformed coil as the coil is being carried by the magnetic core and comprises unhardened thermo-responsive adhesive insulating material; and the step of bonding is effected by hardening said thermo-responsive adhesive insulating material.

3. The method of claim 2 in which the unhardened material is at least partially hardened by heat being created in the coil from the surge of electrical energy generated in the coil turns.

4. The method of claim 1 in which the bonding material is pressure sensitive and the change of configuration of the coil acts to compress the preselected coil portion having the pressure sensitive material so that the conductor turns activate the pressure sensitive material to effect bonding of the preselected coil portion.

5. The method of claim 1 in which the bonding material is an adherent insulating coating covering the individual turns of the coil in its unformed state, and the step of bonding is effected by coatings, covering adjacent turns, adhering to one another.

6. A method for changing the configuration of at least one electrical coil formed by a number of conductor turns having an initial configuration and bonding preselected portions of the turns together, the method comprising the steps of: generating at least one surge of electrical energy in the conductor turns while the conductor turns have the initial configuration and the preselected turn portions have bonding material in contact therewith; said surge of electrical energy changing the configuration of the preselected coil turn portions as the surge produces forces acting on the turns of the coil to effect the desired change of configuration; and securing the preselected turn portions together in the desired configuration by said bonding material.

7. The method of claim 6 in which the bonding material is applied onto preselected individual turn portions of the unformed coil and comprises unhardened thermo-responsive adhesive insulating material; and the step of securing the preselected turn portions is effected by hardening said thermo-responsive adhesive insulating material on the individual turn portions.

8. The method of claim 7 in which the unhardened material is at least partially hardened by heat being created in the coil from the surge of electrical energy generated in the coil turns.

9. The method of claim 6 in which the bonding material is pressure sensitive and the change of configuration of the coil acts to compress the preselected coil portion having the pressure sensitive material so that the conductor turns activate the pressure sensitive material to effect bonding of the preselected coil portion.

10. The method of claim 6 in which the bonding material is an adherent insulating coating covering the individual turns of the coil in its unformed state, and the step of securing the preselected turn portions together is effected by uniting the coatings covering adjacent turns.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—606 |

JOHN F. CAMPBELL, Primary Examiner

J. L. CLINE, Assistant Examiner

U.S. Cl. X.R.

29—421